No. 617,923. Patented Jan. 17, 1899.
W. BUTTLER.
MANUFACTURE OF GLASS CYLINDERS.
(Application filed Mar. 31, 1898.)

(No Model.) 2 Sheets—Sheet 1.

WITNESSES INVENTOR

No. 617,923. Patented Jan. 17, 1899.
W. BUTTLER.
MANUFACTURE OF GLASS CYLINDERS.
(Application filed Mar. 31, 1898.)
(No Model.) 2 Sheets—Sheet 2.

UNITED STATES PATENT OFFICE.

WILLIAM BUTTLER, OF REDKEY, INDIANA.

MANUFACTURE OF GLASS CYLINDERS.

SPECIFICATION forming part of Letters Patent No. 617,923, dated January 17, 1899.

Application filed March 31, 1898. Serial No. 675,870. (No model.)

*To all whom it may concern:*

Be it known that I, WILLIAM BUTTLER, of Redkey, in the county of Jay and State of Indiana, have invented a new and useful Improvement in the Manufacture of Glass Cylinders, of which the following is a full, clear, and exact description, reference being had to the accompanying drawings, forming part of this specification, in which—

Figure 1:
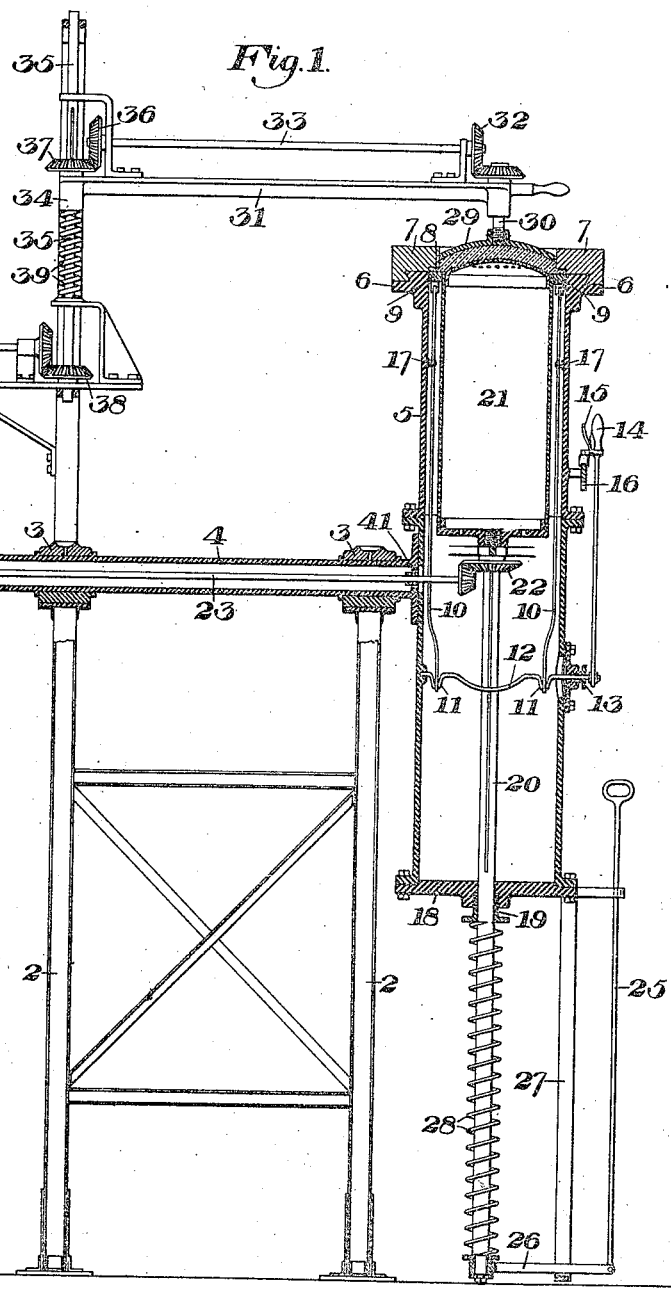
Figure 2:
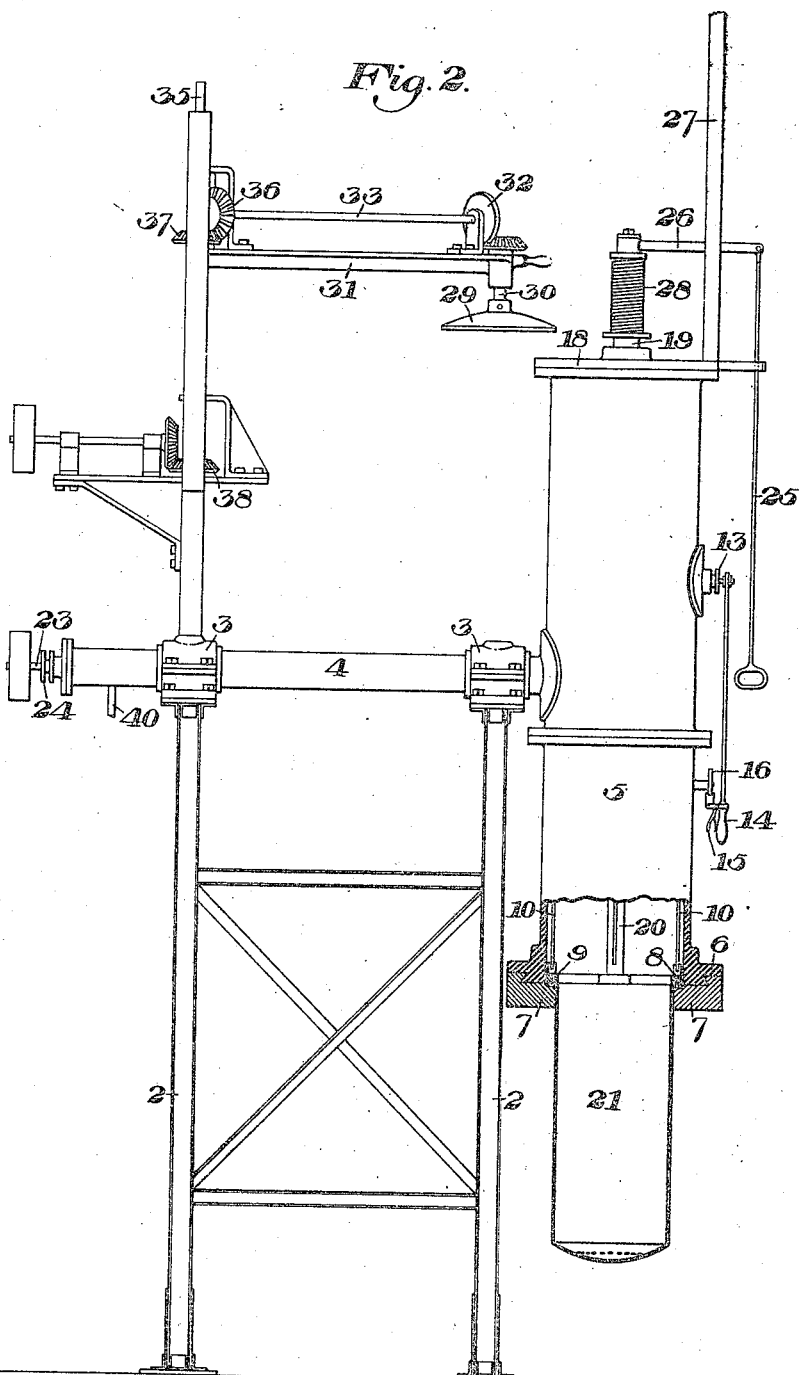

Figure 1 is a side elevation, partly in section, of the improved apparatus I employ; and Fig. 2 is a similar view showing the parts in a different position.

My invention relates to the formation of glass cylinders or rollers by means of an internal former, and is an improvement upon the invention set forth in my prior application, Serial No. 661,786, filed December 14, 1897, for method of and apparatus for making glass rollers.

In the drawings, 2 2 represent a pair of vertical standards having upper bearings 3 3, in which is carried the horizontal hollow shaft 4, to the projecting end of which is secured the metal shell 5. To one end of this shell is secured a ring or flange 6, having a dovetailed connection with a two-part mold-ring 7 7, which is provided with an inner annular recess 8. Within the shell and immediately below this recess is a movable clamping-ring 9, supported upon links 10, pivotally connected with cranks 11 upon a rock-shaft 12, carried in suitable bearings in the shell. One end of this rock-shaft projects through a stuffing-box 13 in the shell and is provided with an actuating-handle 14, which may be held in any adjusted position by a spring tooth or trigger 15, arranged to enter suitable teeth in an arc-shaped lock-plate 16, secured to the shell. The links 10 are guided in their movements in suitable intermediate bearings 17. At the other end of the shell is secured a head 18, provided with a suitable stuffing-box 19, through which passes the stem 20 of a hollow cylindrical shaper 21, which is preferably of the size and length of the glass cylinder desired to be made. The stem 20 has a spline connection with bevel-gear 22, actuated by a shaft 23, extending centrally through the hollow shaft 4 and through a stuffing-box 24 at the end of the hollow shaft. The hollow shaper and stem may be reciprocated within the shell by means of a handle 25, secured to an arm 26 at the end of the stem, this arm moving between suitable guides 27, secured to the head 18. The stem is normally held projected, as shown in Fig. 1, by a spiral spring 28, surrounding the external portion of the stem between a collar thereon and the head of the shell.

In order to block the glass which is dropped into the mold-ring, I provide a block 29, secured to a vertical shaft 30, carried in bearings on arm 31 and actuated by bevel-gear 32, which connects it with a shaft 33, also mounted in bearings on the arm. This arm is carried upon a sleeve 34, which loosely surrounds a vertical shaft 35, supported in suitable bearings upon an extended portion of the standard 2. The shaft 33 is driven by a bevel-wheel 36, intermeshing with a bevel-wheel 37, having a spline connection with the shaft 35, which is driven by suitable bevel-gear 38 at its lower end. The collar 34, with its arm, is normally held elevated by a spiral spring 39, surrounding the shaft 35, and it is evident that with the construction shown the arm may be swung about the shaft and moved vertically, while the block may be rotated in any desired position.

The operation is as follows: The block being swung to one side of the shell, molten glass is dropped upon the upper end of the shaper and the mold-ring clamped in place at the upper end of the shell. The block then being swung into the position shown in Fig. 1 is suitably rotated so as to block the glass, which has previously been forced into the annular recess in the ring and clamped in such recess by the movable clamping-ring 9. The block then being raised and swung to one side, the apparatus is swung over upon the shaft 4, so as to bring the glass within the mold-ring to the lower end of the shell, and the internal shaper 21 is moved downwardly and rotated so as to stretch the glass over it and shape the cylinder. At the same time compressed air is admitted to the hollow shaft 4 through a suitable pipe 40 and, passing up around the inner shaper and also through suitable perforations 41 therein, contacts with the glass and prevents its being drawn tightly against the former. It is not intended that sufficient air pressure shall be provided to increase the diameter of the glass cylinder to any substantial amount over that of the shaper. While these operations are proceeding, the shell may be oscillated back and forth in somewhat the way that cylinders are swung by blowers upon their blowpipes, so as to assist in the elongation of the cylinder. When the glass cylinder has thus been formed, the internal former is retracted, and the mold then being unclamped the finished cylinder may be removed.

The advantages of my invention will be apparent to those skilled in the art. The cylinder is quickly and easily formed without the prior formation of any hollow blank. The glass may be blocked so as to distribute it evenly, and as the glass tends to elongate by reason of its weight and the supporting shell may be swung back and forth all the advantages of the hand method are present, while the inner shaper insures a perfect cylinder of the same thickness and diameter throughout and that without the use of skilled labor. As the former is rotated while the cylinder is being formed a finely-finished surface will be obtained upon the interior of the roller, while the air-pressure prevents the cylinder from pinching about the shaper or former during its formation.

Instead of rotating the former during the formation of the cylinder the mold, with its blank, may be rotated about the former, or the former, the mold, and the glass may all be rotated together, while the mold and former are moved longitudinally relative to each other. An outside mold may be clamped around the cylinder after it is stretched. The blocking may be dispensed with and the device may be used with or without an air-pressure, and many other variations may be made without departing from my invention, since

What I claim is—

1. The method of forming glass rollers consisting in dropping the glass into a shallow holder, holding its edges, and stretching the same longitudinally beyond the end of the holder over an internal former.

2. The method of forming glass rollers, consisting in dropping the glass into a holder, securing its edges, blocking or shaping the glass therein, and then stretching the same longitudinally beyond the holder.

3. The method of forming glass rollers, consisting in dropping the glass into a holder, clamping its edges, stretching the same longitudinally over an internal former, and swinging the glass-carrier back and forth with an oscillatory motion during the formation of the roller.

4. The method of forming glass cylinders, consisting in dropping the glass into a holder, securing its edge portions, stretching the same longitudinally beyond the holder over an internal former, and forcing air between the blank and the former.

5. The method of making glass rollers consisting in dropping the glass into a holder, blocking the glass therein, clamping its edge portions, reversing the glass-holder so the glass will tend to elongate downwardly, and then stretching the glass longitudinally over an internal former.

6. In apparatus for forming glass cylinders, the combination with a shallow mold and an internal former of greater length than the mold, of means for moving one of said parts longitudinally of the other, and means for rotating at least one of said parts.

7. In apparatus for forming glass cylinders, the combination with a shallow mold arranged to hold the edge portions of the glass dropped therein, of a rotary internal former of greater length than the mold, and means for moving the mold and former longitudinally relatively to each other to stretch the glass beyond the mold.

8. In apparatus for forming glass cylinders, a hollow shell, a shallow mold carried thereon, a hollow former within the shell and of much greater length than the mold, and means for moving the mold and former relatively to each other to stretch the glass beyond the mold.

9. In apparatus for forming glass cylinders, a shell arranged to swing freely to and fro, a mold mounted thereon, and means for supplying air to the shell.

10. In apparatus for forming glass cylinders, a swinging support, a mold carried thereon, an internal former of greater length than the mold, and means for moving the mold and former relatively to each other to stretch the glass beyond the mold.

11. In apparatus for forming glass cylinders, the combination with a mold, of means for holding the edge portion of glass dropped into the mold, an internal former arranged to stretch the glass longitudinally beyond the mold, and means for moving the former and mold relatively to each other.

12. In apparatus for forming glass cylinders, a swinging support, a mold at one end of the same arranged to receive and hold the edge portions of the glass, an internal former, and means for forcing the same through the mold so as to shape a cylinder over it.

13. In apparatus for forming glass cylinders, a swinging shell, a mold carried upon the same and having means for clamping glass dropped thereinto, a rotatable hollow former, and means for moving the mold and former relatively to each other so as to stretch the glass over the former.

14. In apparatus for forming glass cylinders, a hollow shell, a mold carried at one end of the same, a former which is of greater length than the mold and forms its bottom, means for clamping the glass dropped into the mold, and means for forcing the former longitudinally through the mold so as to stretch the glass.

15. In apparatus for forming glass cylinders, a swinging support, a mold carried upon the same, and a reciprocatory internal former of greater length than the mold and forming its bottom.

16. In apparatus for forming glass cylinders, a hollow shell, a mold carried at one end of the same, a rotatable and longitudinally-movable former of greater length than the mold arranged to stretch the glass longitudinally, and means for supplying air between the glass cylinder and the former.

17. In apparatus for forming glass cylinders, a swinging support carrying a glass ring or mold, a block arranged to shape the glass in the mold, and an internal former of greater length than the mold arranged to be moved through and beyond the mold and stretch the glass over it.

In testimony whereof I have hereunto set my hand.

WILLIAM BUTTLER.

Witnesses:
FRED WOLTJEN,
M. L. BURGESS.